United States Patent [19]

Estes

[11] Patent Number: 4,552,737

[45] Date of Patent: Nov. 12, 1985

[54] METHOD TO IMPROVE YIELDS OF SODIUM HYPOPHOSPHITE

[75] Inventor: William E. Estes, Ossining, N.Y.

[73] Assignee: Stauffer Chemical Company, Westport, Conn.

[21] Appl. No.: 570,478

[22] Filed: Jan. 13, 1984

[51] Int. Cl.$^4$ .............................................. C01B 15/16
[52] U.S. Cl. ..................................................... 423/307
[58] Field of Search ........................................ 423/307

[56] References Cited

FOREIGN PATENT DOCUMENTS 1119237 12/1961 Fed. Rep. of Germany ...... 423/307

Primary Examiner—John Doll
Assistant Examiner—Wayne A. Langel
Attorney, Agent, or Firm—Vivienne T. White

[57] ABSTRACT

A process of producing sodium hypophosphite ($Na_2H_2PO_2$) is disclosed wherein the yield of the product is increased. The process comprises increasing the $NaOH/P_4$ ratio above stoichiometric quantity to from about 2.4 to about 3.0 while maintaining a $Ca(OH)_2/P_4$ ratio of above about 1.21 in the reaction wherein phosphorus, sodium hydroxide, calcium, hydroxide and water are reacted to produce sodium hypophosphite. The invention further comprises a corresponding increase in dilution ($H_2O/P_4$) to from about 38 to about 60.

4 Claims, No Drawings

METHOD TO IMPROVE YIELDS OF SODIUM HYPOPHOSPHITE

FIELD OF THE INVENTION

The invention relates to an improved process for manufacturing sodium hypophosphite wherein the yields of the product are significantly increased.

RELATED ART

In a batch process for the manufacture of sodium hypophosphite, sodium hydroxide, water and calcium hydroxide are reacted with liquid phosphorus. In this process hydrated lime, generally 50% caustic, and water are slurried and liquid phosphorus is added to the slurry over a period of hours. The main reactions of the process are as follows:

$$4NaOH + P_4 + 8H_2O \rightarrow 4NaH_2PO_2 \cdot H_2O + 2H_2 \uparrow \quad (1)$$

$$2CA(OH)_2 + P_4 + 4H_2O \rightarrow 2Ca(H_2PO_2)_2 + 2H_2 \uparrow \quad (2)$$

$$P_4 + 2Ca(OH)_2 + 5H_2O \rightarrow 2CaHPO_3 \cdot 1\tfrac{1}{2}H_2O \downarrow + 2PH_3 \uparrow \quad (3)$$

$$4 P_4 + 4NaOH + 2H_2O \rightarrow 2Na_2HPO_3 + 2PH_3 \uparrow \quad (4)$$

$$NaH_2PO_2 + NaOH \rightarrow Na_2HPO_3 + H_2 \uparrow \quad (5)$$

During the reaction, the gaseous byproducts, phosphine and hydrogen, are vented to an incinerator. The reaction slurry, consisting of $NaH_2PO_2$, $CaHPO_3 \cdot 1\tfrac{1}{2}H_2O$, and $H_2O$, as well as small quantities of $Ca(H_2PO_2)_2$ and $Na_2HPO_3$, is filtered to remove the insoluble calcium phosphite, and the calcium hypophosphite is converted to the sodium salt via reaction with bicarbonate. The calcium carbonate resulting from the calcium to sodium salt conversion is separated via filtration, and the filtrate is concentrated by evaporation under vacuum. The product is then crystallized, separated from the liquor, and dried.

In the above-described commercial process of the prior art, the reaction stoichiometry ratio is generally $P_4 = 1$; $NaOH = 1.99$; $Ca(OH)_2 = 1.43$; $H_2O$ of 35.4. Due to the complex series of reactions which occur, the disproportionation of phosphorus occurs and a variety of products are produced. The yield of the sodium hypophosphite product ($NaH_2PO_2$) as a result is generally about 50–55 wt. %.

It is an object of the invention to provide a means of increasing the yield of hypophosphite product.

SUMMARY OF THE INVENTION

It was discovered that maintaining a lime to phosphorus ratio of above about 1.21 while increasing the $NaOH$ to $P_4$ ratio to from about 2.4 to about 3.0 greatly increased product yield of sodium hypophosphite.

DETAILED DESCRIPTION OF THE INVENTION

A method of enhancing the yield of sodium hypophosphite has been found. The method comprises increasing the $NaOH/P_4$ to from about 2.4 to about 3.0 while maintaining a corresponding increase in the $Ca(OH)_2/P_4$ ratio of at least 1.21 in the reaction where phosphorus is reacted with sodium hydroxide, lime and water to produce sodium hypophosphite.

In the process of the invention, in contradistinction to the prior art, increased yields of sodium hypophosphite are achievable by varying the known stoichiometry of the system.

It was discovered that increasing the $Ca(OH)_2/P_4$ ratio to at least 1.21 and preferably 1.43 while correspondingly increasing the $NaOH/P_4$ ratio to from about 2.4 to about 3.0 and further increasing the $H_2O/P_4$ ratio from about 38 to about 60 caused a significant increase in the yield of sodium hypophosphite.

The higher caustic levels increased the overall kinetics of the process, especially the $PH_3/H_2$ evolution. With the increase in the caustic, insufficient $Ca^{2+}$ ions were available to precipitate the phosphite formed. A corresponding increase in the $Ca(OH)_2/P_4$ ratio provided the required $Ca^{2+}$ ions. In addition, a corresponding increase in the water content was utilized in accordance with the invention disclosed in U.S. patent application Ser. No. 570,477 filed on even date herewith, entitled "method of Improving the Yield of Sodium Hypophosphite".

Increasing the caustic ratio of $P_4/NaOH$, however, above about $\tfrac{3}{4}$ causes a drop in the yield which is postulated might be due to either decomposition of $H_3PO_2^{31}$ by the excess $OH^-$ ions or by a common ion effect due to sodium. The higher caustic levels in addition causes potentially dangerous vigorous reaction when the water to $P_4$ level is below 40:1.

In the instant invention, therefore, the lime to phosphorus concentration of at least 1.21 is maintained with an increase in the $NaOH/P_4$ molar ratio of from about 2.4 to about 3.0 and preferably from about 2.4 to about 2.7.

The process as previously disclosed consists of adding the above quantities of sodium hydroxide solution, calcium hydroxide and phosphorus to a reaction with agitation. The sodium hydroxide and calcium hydroxide are generally added in a slurry to the heated water, generally heated from about 80° C. to about 100° C. In the Examples provided, phosphorus is then added over a period of about 0.5 to 0.75 hours while the temperature is maintained at from about 80 to about 110° C. and preferably from about 90° C. to 100° C. The reaction is continued for an additional time, generally 2 hours in the commercial process and the reactor is sparged with steam during the reaction period and purged with an inert gas and cooled to about 50° C. after the reaction has been completed.

The reaction products comprise sodium hypophosphite, calcium hypophosphite, calcium phosphite, and gases phosphine and hydrogen, which are vented and burned. The insoluble calcium phosphite is separated and in the commercial process, the hypophosphites are treated with sodium bicarbonate to convert excess $Ca(OH)_2$ to $CaCO_3$ and $NaCO_3$ is used to convert the $Ca(H_2PO_2)_2$ to sodium hypophosphite and $CaCO_3$.

The insoluble $CaCO_3$ is separated and the sodium hypophosphite recovered by known means as for instance by evaporation and crystallization.

The Examples are laboratory scale processes and as is disclosed, contain minor variations from the commercial process described in the related art section of the specification. The yields disclosed are based on the total amount of $P_4$ reacted in the process and not on the calculated total amount of $P_4$ obtained from the assays conducted on the various reaction products.

The reaction conditions described are those generally used and are not intended to be limiting. The reaction time, for instance, will depend on the amount of reactants utilized.

Both normal and simultaneous addition modes for combining the reactants were utilized in the Examples as indicated. The commercial process described in the relevant art section of the specification disclose a normal addition mode wherein the phosphorus is added to a slurry of the other reactants. In the simultaneous mode, the various reactants are fed simultaneously to the reactor containing water.

The following Examples are offered as embodiments of the invention and are not intended to limit the scope of the invention.

EXAMPLE 1

Into a water jacketed reactor containing a hot slurry (90° C.) comprised of 73.6 grams of 50 wt. % NaOH, 40:1 grams of $Ca(OH)_2$ and 236.1 grams of white molten phosphorus. The amounts of reactants correspond to a $P_4/NaOH/Ca(OH)_2/H_2O$ mole ratio of 1/2.43/1.43/40 based on 0.379 moles of $P_4$. The phosphorus was charged over a period of 24 minutes. During the $P_4$ addition and subsequent reaction, the reactor temperature was maintained at between 95°–100° C. The reaction was complete when pipes conveying by-product gases phosphine and hydrogen from the reactor to a burner tower extinguished after about one hour of total reaction time.

The reactor slurry was filtered hot (90–95° C.) and then allowed to cool to about 60° C. and washed with 300 ml. of water. The filtrate washes were combined and assayed for sodium hypophosphite. The filter cake was dissolved in 6N HCl and assayed for $HPO_3^{-2}$ as $Ca(HPO_3)$. The mass balance was completed by assaying the burner-scrubber liquors for $P_2O_5$ which is the amount of phosphine produced. The results obtained based on the amount of $P_4$ used were as follows Sodium hypophosphite ($NaH_2PO_2$): 61.9%
Calcium phosphite: 18.79%
Phosphine: 19.25%

The mass balance of the reaction was 99.95%.

EXAMPLE 2

The process of Example 1 was repeated in duplicate runs using the following mole ratios of reactants:

$P_4 = 1$, $NaOH = 2.43$, $Ca(OH)_2 = 1.43$ and $H_2O = 50$ based on 0.379 moles of $P_4$. The average yield of $NaH_2PO_2$ was of 62.1%±2%. with a mass balance of 100%±2.5% over the tow runs.

EXAMPLE 3

Three experiments were run using the process described in Example 1, the reactants having a $p_4/NaOH/Ca(OH)_2/H_2O$ mole ratio of 1/2.24/1.31/50 based on 0.379 moles of $P_4$.

The average yield obtained was 62.8%±2% with the overall mass balance being 103%±3.8% based on $P_4$.

EXAMPLE 4

The process of Example 1 was repeated using a $P_4/NaOH/Ca(OH)_2 H_2O$ mole ratio of 1/2.24/1.31/40 based on 0.379 moles of $P_4$. The assay revealed a yield of $NaH_2PO_2$ of 62.1%.

EXAMPLE 5

The process of Example 1 was repeated using a $P_4/NaOH/Ca(OH)_2/H_2O$ mole ratio of 1/2.43/1.43/35.4 based on 0.379 moles of $P_4$. The yield of $Na_2H_2PO_2$ was 59.6%.

EXAMPLE 6

A simultaneous mode of addition was used in this Example. A slurry of 73.6 grams of 50 wt. % NaOH, 33.9 grams of $Ca(OH)_2$ and water was placed in a feed station to the water packed reactor of Example 1. White phosphorus (46.9 g. 0.379 moles) was heated to 90° C. and placed in another feed station to the reactor. The reactor, contained water sufficient to bring the final reaction stoichiometry to $P_4/NaOH/Ca(OH)_2/H_2O = 1/2.43/1.21/35$. After the water in the reactor reached 90° C. the caustic lime slurry and molten phosphorus were simultaneously pumped into the reactor and the reaction performed as in Example 1. Assays obtained gave the following results:

$Na_2H_2PO_2 = 60.3\%$
$CaHPO_3 = 20.28\%$
$PH_3 = 20.57\%$ based on a mass balance of 101.3%.

What is claimed:

1. A process for increasing the yield of sodium hypophosphite produced by the reaction of phosphorus, sodium hydroxide, water and calcium hydroxide, comprising increasing the $NaOH/P_4$ from stoichiometric amount to within the range of from about 2.4 to about 3.0 while maintaining the lime to phosphorus ratio above about 1.21.

2. The process of claim 1 further comprising a water/$P_4$ mole ratio of from about 38 to about 60.

3. The process of claim 1 wherein the $NaOH/P_4$ ratio is from about 2.4 to about 2.7.

4. The process of claim 1 wherein the $Ca(OH)_{2/P4}$ ratio is 1.43.

* * * * *